United States Patent Office 2,948,358
Patented Aug. 9, 1960

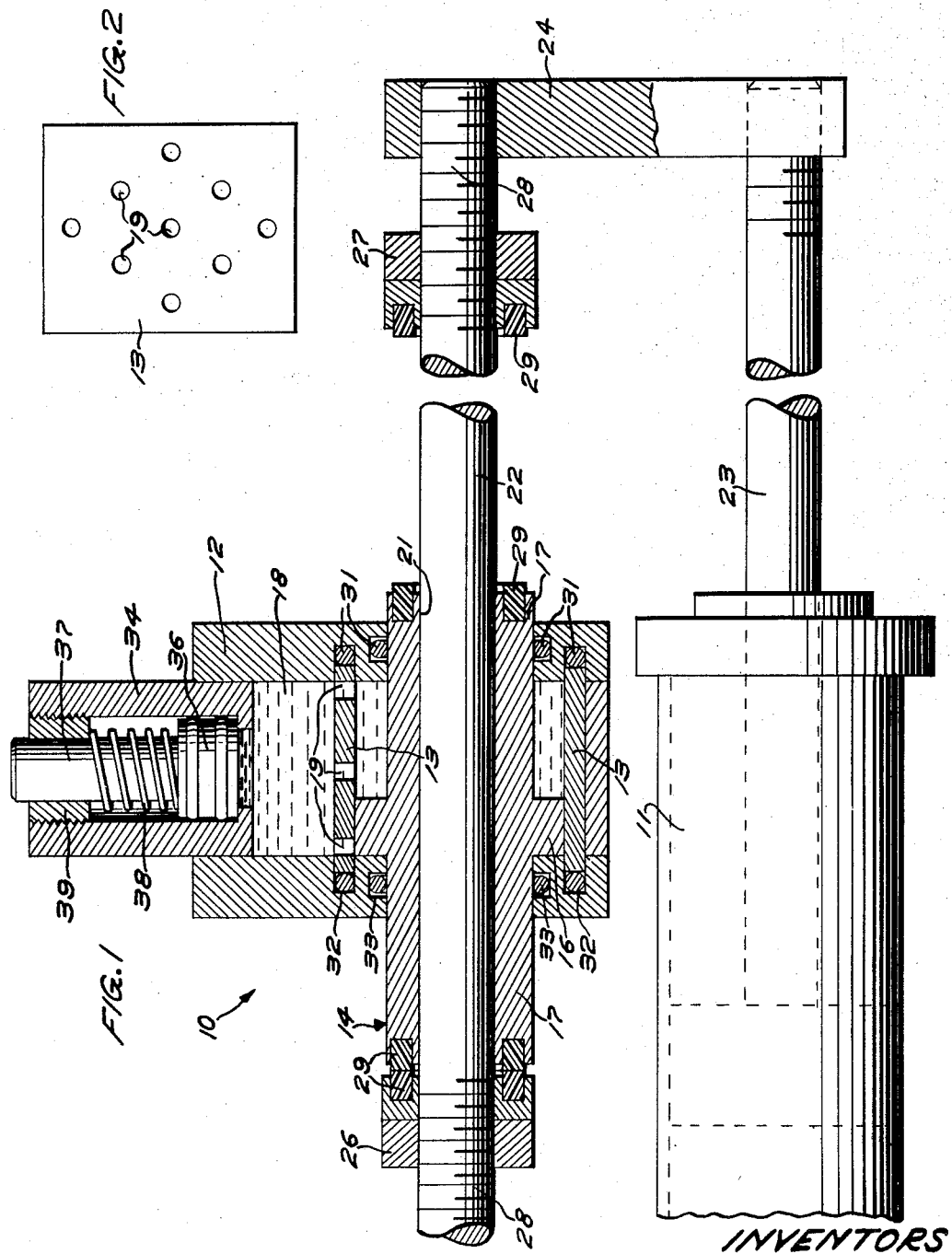

2,948,358

HYDRAULIC SHOCK ABSORBER

James H. Born, Lombard, Willard D. Drukker, Downers Grove, and Heinz F. Runge, Brookfield, Ill., assignors to Western Electric Company, Incorporated, New York, N.Y., a corporation of New York Filed Feb. 10, 1958, Ser. No. 714,394

3 Claims. (Cl. 188—97)

This invention relates to a shock absorber or more particularly to a hydraulic shock absorber connected to a high speed, long stroke piston rod for imparting a rapid, smooth and uniform termination to the stroke of a piston rod.

Many difficulties have been encountered in the operation of high speed pistons in relation to the termination of the stroke of the high velocity pistons. Deceleration of these high velocity pistons is required to prevent damage to the piston and/or cylinder in which the pistons are travelling. Shock absorbing devices in the past have been inadequate in that they are usually placed within the high speed cylinder thereby requiring extra bulk and length. In general, prior shock absorbers have been designed to operate satisfactorily at only one speed and stroke length, hence, when the speed or stroke length is varied, the piston is not brought to a stop with a smooth and uniform deceleration.

It is, therefore, the object of this invention to overcome these difficulties by providing a new and novel shock absorbing device for stopping high velocity reciprocating members which will operate efficiently over a wide range of forces, speeds and stroke length.

Another object of the invention is to provide a shock absorbing device for high speed pistons capable of terminating the stroke of the piston by producing a uniform and constant deceleration independent of the speed of the piston.

A further object of the invention is to provide an external shock absorbing device having a primary piston for terminating the stroke of a driving member and a secondary dampening piston to absorb the shock of the initial movement of the primary piston.

With these and other objects in view the present invention contemplates a shock absorbing device to be connected to a piston rod moving at a high velocity in an air cylinder. The shock absorbing device consists of a fluid reservoir and a longitudinally extending chamber or cylinder mounted therein. This cylinder or chamber is provided with a predetermined orifice configuration which controls the speed of a shock absorbing piston movable therein. The shock absorbing piston has a concentric bore extending therethrough and has a centrally located flange for sliding contact within the cylinder. A shaft is movable within the bore of the piston and is connected to move parallel with the piston rod to be controlled. The shaft is also provided at opposite ends with stops to engage the shock absorbing piston near the terminations of the advance and return strokes of the piston rod. Upon the movement of the shock absorbing piston under the force of the stops, fluid is displaced from the cylinder through the orifice configuration into the fluid reservoir. A dampening piston yieldably mounted in the reservoir is provided for absorbing the shock of the initial movement of the shock absorbing piston riding within the cylinder.

Other objects, advantages and novel features of the invention will become apparent upon consideration of the following detailed description in conjunction with the accompanying drawings wherein:

Fig. 1 is a side elevational view, in full section, showing a hydraulic shock absorbing device connected to a high speed piston rod in accordance with the principles of the present invention; and Fig. 2 is a top elevational view of an orifice configuration formed in a cylinder within the shock absorbing device for controlling the speed of the piston rod.

Attention is now directed to Fig. 1 wherein a shock absorbing device, generally designated as 10 is shown connected to a high velocity, long stroke piston rod 23 operated by an air cylinder 11. The shock absorbing device comprises a fluid retaining reservoir 12 having a cylinder 13 mounted in opposite walls of the reservoir for supporting a piston 14.

The piston 14 has a circular flange 16 for sliding engagement with the inner walls of the cylinder 13 and two end portions or projections 17 of the piston 14 have a sufficient length such that both end portions extend beyond the walls of the reservoir 12 throughout the entire stroke of the piston. As the piston 14 is moved along the cylinder 13, the leading side of the flange 16 forces a fluid 18, within the cylinder 13 through a plurality of orifices 19 that are formed in the cylinder in a predetermined configuration. The fluid 18 is preferably an oil, the viscosity of which may be varied depending upon the desired control of the speed of the piston 14.

A bore 21 is provided through the piston 14 for slidably supporting a shaft 22. The shaft 22 extends parallel to the piston rod 23 projecting from the air cylinder 11 and is connected thereto by means of bracket 24. Stops 26 and 27 are mounted on the shaft 22 on either side of the piston 14 and are adjustably positioned on the shaft by means of threaded portions 28. The stops are positioned on the shaft 22 in such a manner that the stops will engage the piston 14 near the terminations of the advance and return strokes of the piston rod 23. The stops 26 and 27 and the piston 14 are provided with replaceable inserts 29, preferably of Teflon or other suitable wear resistant material, for preventing wear and excess noise caused by the contact of the stops with the piston. Resilient-type seals 31 are placed in slots 32 and 33 formed in the walls of the reservoir 12 to prevent leakage of the fluid 18 from the reservoir.

Speed control of the piston 14 can be obtained by varying the number of orifices, the orifice size, the orifice configuration and the viscosity of the fluid. As the piston 14 is moved along the cylinder 13, the flange 16 forces the fluid 18 through the orifices 19. The maximum speed of the piston can, therefore, be determined by the number of orifices and the size of each orifice along with the viscosity of the fluid. The rate of acceleration and deceleration can likewise be controlled by the arrangement of the orifices formed in the cylinder 13. As disclosed in Fig. 2, the orifice configuration consists of 5 rows of orifices; the center row having the greatest number and the rows decreasing in the number of orifices as the ends of the cylinder 13 are approached. Although a specific orifice configuration is shown and described, it is to be understood that any variety of orifice size, shape and configuration may be used to produce any desired acceleration or deceleration of the piston 14. The piston 14, when in the extreme left or right-hand position, blocks the first two rows of orifices such that upon initial movement, the piston can move at maximum speed and as the piston continues toward the termination of its stroke, the number of orifices through which fluid can be forced is decreased thereby causing a gradual deceleration of the piston.

Upon movement of the piston rod 23 and thereby the shaft 22, one of the stops 26 or 27 will strike the piston 14 near the termination of the stroke of the piston rod 23. If the force of the stop 26 or 27 against the piston 14 is large enough to tend to move the piston 14 at a greater speed than allowable, due to the orifice configuration and fluid viscosity, the piston will lurch forward. This initial movement of the piston attempts to compress the fluid in front of the flange 16 which instantaneously creates a vacuum behind the flange 16. As the fluid cannot be compressed by the piston and is allowed to flow through the orifices only at a maximum rate, the piston comes to a sudden halt and thus the piston is caused to move along the cylinder in a lurching and jerking manner. Also, upon initial movement of the piston, the fluid is forced through the orifices in front of the flange 16 faster than the fluid can flow behind the flange because of the greater number of orifices in front of the flange, which also causes the piston to temporarily stop and thus add to the non-uniform movement of the piston.

To prevent the occurrence of these conditions, an auxiliary cylinder 34 is mounted in the upper portion of the fluid reservoir 12. The auxiliary cylinder 34 carries a slidable dampening piston 36 secured to a rod 37. The dampening piston is urged toward the fluid 18 by means of a spring 38, the force of which against the dampening piston 36, may be adjusted by means of a screw plug 39.

If one of the stops 26 or 27 strikes the piston 14 with a force tending to move the piston at a speed greater than allowed by the existing orifice configuration and fluid viscosity, excess force is placed on the piston 14. This excess force is transferred through the fluid 18 to the dampening piston 36 causing the dampening piston to retract within the auxiliary cylinder 34, thereby allowing extra space in the reservoir to compensate for the excess fluid that is forced from in front of the flange 16 that cannot flow behind the flange. After the instantaneous shock is absorbed by the dampening piston 36, the spring 38 forces the dampening piston back to its original position and thereby forces the fluid behind the trailing side of the flange 16 of the piston 14.

*Operation*

Assuming that the air cylinder 11 is driving the piston rod 23 to the right, as viewed in Fig. 1, and that the piston rod 23 is near the termination of its stroke, the shaft 22 also moves to the right and will move the stop 26 against the left-hand end portion 17 of piston 14. If the piston rod 23 is moving at a high velocity, the stop 26 will strike the piston 14 with a force tending to move the piston toward the right at a velocity higher than the piston is capable of travelling because of the restrains imposed upon the flange 16 of the piston 14 by the size, number and configuration of the orifices 19 and the viscosity of the fluid 18. The excess force applied to the piston 14, which attempts to move the piston faster than it is capable of moving, will be transmitted through the fluid to the dampening piston 36 causing the dampening piston to retract within the cylinder 34. As the piston 14 moves along the cylinder 13, force of the spring 38 will force the fluid behind the trailing side of the flange 16 of the piston 14, and the piston will decelerate at a uniform rate.

It is to be understood that the above-described operation, arrangement of apparatus and construction of elemental parts are simply illustrative of the application of the principles of this invention and many other modifications may be made thereto without departing from the scope and spirit of the invention.

What is claimed is:

1. A shock absorber for a moving member comprising a fluid retaining reservoir, a cylinder mounted within the reservoir having a plurality of orifices formed therein, a primary piston mounted within the cylinder having end portions extending through the walls of the reservoir and having a bore extending therethrough, said orifices arranged in a predetermined pattern for controlling the acceleration of the primary piston, a shaft connected to the moving member and mounted in the bore for engaging and moving the primary piston to cover and uncover successive orifices, a secondary piston mounted in said reservoir, and means for urging the secondary piston against the fluid within the reservoir for absorbing the instantaneous shock upon the initial movement of the primary piston.

2. A shock absorbing device for a high velocity piston rod comprising a fluid-retaining reservoir, a cylinder mounted within the fluid retaining reservoir and having a predetermined orifice configuration, a shock absorbing piston movable within said cylinder, projections extending from each end of the piston and through the walls of the reservoir, means connected to the piston rod for engaging said projections near the terminations of the advance and return strokes of the piston rod, and a spring-biased dampening piston mounted within the reservoir and urged against the fluid within the reservoir for absorbing the shock of the initial movement of said shock absorbing piston.

3. A shock absorbing device for a high velocity reciprocating member comprising a fluid retaining reservoir, a first cylinder within said reservoir having a predetermined orifice configuration, a piston reciprocable within the cylinder and having axial extensions projecting through the walls of the reservoir, said piston and extensions having a concentric bore therethrough, a shaft connected to the reciprocating member and movable within said bore, said shaft having stops thereon for engaging the extensions and driving the piston near the terminations of the advance and return strokes of the reciprocating member, an auxiliary cylinder mounted in said reservoir, and a spring biased dampening piston movable within the auxiliary cylinder for absorbing the instantaneous shock of the movement of the piston in said first cylinder.

References Cited in the file of this patent

UNITED STATES PATENTS

| 984,377 | Kilgour | Feb. 14, 1911 |
| 1,205,818 | Thomas | Nov. 21, 1916 |
| 1,285,521 | Wiberg | Nov. 19, 1918 |
| 1,468,652 | Story | Sept. 25, 1923 |
| 1,658,962 | Aikens | Feb. 14, 1928 |
| 1,945,499 | Flarsheim | Jan. 30, 1934 |
| 2,485,953 | Barth | Oct. 25, 1949 |
| 2,559,047 | Porter et al. | July 3, 1951 |
| 2,580,751 | Fletcher | Jan. 1, 1952 |
| 2,825,427 | Steibel | Mar. 4, 1958 |

FOREIGN PATENTS

| 1,081,669 | France | June 9, 1954 |
| 132,399 | Sweden | July 17, 1951 |